United States Patent Office

3,687,627
Patented Aug. 29, 1972

3,687,627
STABILIZED HYDROGEN PEROXIDE SOLUTIONS
Neil J. Stalter, Wilmington, Del., assignor to E. I. du Pont de Nemours and Company, Wilmington, Del.
No Drawing. Filed June 25, 1970, Ser. No. 49,946
Int. Cl. C01b *15/02;* C09k *3/00*
U.S. Cl. 423—271        20 Claims

ABSTRACT OF THE DISCLOSURE

Acidic stabilized hydrogen peroxide solutions are disclosed which contain from about 10 to 90% $H_2O_2$, a soluble stannate stabilizer, a soluble magnesium salt such as Epsom salt, at a concentration of at least 10 grams per liter, and an alkylidene diphosphonic acid or a soluble salt thereof at a concentration sufficient to prevent precipitation of the stannate by the magnesium salt. In preferred embodiments, the hydrogen peroxide solution will also contain a soluble pyrophospate or fluosilicate. When diluted with water to peroxide concentrations generally employed in most use applications, the diluted solutions require only the addition of an alkali to provide alkaline peroxide solutions containing a magnesium compound which is an effective stabilizer for the alkaline peroxide solutions during use, e.g. in bleaching applications.

BACKGROUND

Field of the invention

This invention relates to stannate-stabilized acidic hydrogen peroxide solutions which also contain a sufficient amount of a soluble magnesium salt, so that when the solutions are diluted and made alkaline, alkaline peroxide solutions containing effective concentrations of a magnesium compound stabilizer are obtained.

Prior art

In many of its important commercial uses, hydrogen peroxide is employed in the form of relatively dilute aqueous solutions which are rendered alkaline by the addition of one or more alkaline materials such as caustic soda, ammonium hydroxide, lime, sodium silicate and the like. Examples of such uses are the bleaching of materials such as textiles, wood pulps, wood surfaces and the like, and the destruction of cyanides, e.g. in used cyanide plating solutions and waste streams associated with cyanide plating operations. In such uses, the alkaline peroxide solutions are generally employed at elevated temperatures, but whether or not elevated temperatures are employed, it is generally desired, if not required, that a stabilizer for the peroxide be present in order to assure the effective and efficient use of the peroxide. Furthermore, it is well known that when an alkaline peroxide solution is used to bleach fibrous cellulosic materials such as textiles and wood pulp, excessive instability of the peroxide solution often causes serious degradation of the cellulose.

It is well known that hydrogen peroxide is considerably less stable in alkaline solutions than in acidic solutions and that its decomposition in alkaline solutions is accelerated by the presence of tramp ions of heavy metals such as copper, iron, manganese, chromium and the like. Many materials have been proposed as stabilizers for alkaline peroxide solutions and magnesium compounds are recognized as effective stabilizers. The magnesium ions supplied by such compounds are thought to function by reacting with the alkalizing agent or agents to form soluble or colloidal compounds which inactivate such tramp heavy metal ions. At any rate, the addition of a soluble magnesium compound, e.g. Epsom salt, to alkaline peroxide solutions, particularly solutions which also contain a soluble silicate, e.g. sodium silicate, or a soluble pyrophosphate, e.g. sodium pyrophosphate, has long been practiced because of the effective stabilization resulting. The use of magnesium salts for this purpose is disclosed in many patents, including the following U.S. patents: Eugen De Haen 482,477; Schmidt 1,155,102; Schaidhauf 1,181,409, 1,181,410 and 1,278,389; Reichert et al., 2,160,391; Lind et al. 2,254,434; Kauffman et al., 283,141; Campbell et al. 2,333,916; McEwen 2,527,563; Sprout 2,838,459; and Dithmar 3,003,910.

While magnesium compounds are effective stabilizers for alkaline hydrogen peroxide solutions such as are required in many use applications, they are not regarded as effective stabilizers for acidic hydrogen peroxide solutions. Hydrogen peroxide is generally produced and sold commercally as relatively concentrated, e.g. 10 to 90% and more commonly 30 to 75%, acidic solutions. Although many materials have been proposed as stabilizers for such solutions, the soluble stannates, particularly sodium stannate, either alone or in combination with other materials, have long been known to be outstanding stabilizers and they have been widely used commercially for many years. U.S. patents disclosing the use of soluble stannate stabilizers for acidic hydrogen peroxide solutions, particularly the high strength solutions sold commerically, include the following: Reichert 1,958,204, Panepinto 2,783,132, Roth 2,872,293, Baker 2,904,517, Meeker 3,114,606, Young 3,333,925 and Reilly and Stalter 3,387,939. While stannates are effective stabilizers for acidic peroxide solutions as disclosed in these patents, they are of little, if any, value as stabilizers in alkaline peroxide solutions.

The above Reilly and Stalter patent discloses stannate stabilizer compositions containing an alkylidene diphosphonic acid and acidic hydrogen peroxide solutions stabilized therewith. The patent points out that one major problem attending the use of stannate stabilizers is the tendency of stannate to be precipitated by polyvalent cations such as aluminum cations introduced when the peroxide solutions are stored or handled in aluminum containers or vessels, and calcium and magnesium cations introduced when the peroxide solutions are diluted with hard water. As disclosed in the patent, the presence of the alkylidene diphosphonic acid along with the stannate prevents the precipitation of the stannate by the above polyvalent cations when introduced as indicated. Avoidance of stannate precipitation is highly desirable because precipitated stannate is much less effective as a stabilizer than is soluble stannate. Carnine U.S. Pat. 3,383,174 discloses use of a nitrilo trimethylene phosphonic compound in stannate stabilized peroxide solutions for a similar purpose. Morris et al. U.S. Pat. 3,356,457 discloses that precipitation of stannate by aluminum ions at low concentrations can be prevented by providing aluminum ions at higher concentrations sufficient to reverse the charge of the stannate sol or colloid. Finally, Morris et al. U.S. Pat. 3,429,666 discloses that stannate precipitation by aluminum ions can be prevented by the presence of a water soluble fluoride such as ammonium fluoride.

While the above Reilly and Stalter patent discloses the effectiveness of alkylidene diphosphonic acids in preventing stannate precipitation in the presence of relatively low concentrations of calcium and magnesium ions such as result from the dilution of the stannate stabilized peroxide solutions with hard water, there is no teaching that such alkylidene diphosphonic acids would prevent stannate precipitation in the presence of high concentrations of magnesium ions. Furthermore, none of the above patents teaches the incorporation of magnesium salts at high concentrations in stannate stabilized acidic hydrogen peroxide solution, or any reason for doing so.

Since stannates are perhaps the most effective stabilizers for acidic hydrogen peroxide solutions of the usual commercial strengths, it would be highly desirable if such a stannate stabilized solution could be provided so as to contain a material which would function as an effective stabilizer for the solution during use after it has been diluted and made alkaline. Thus, a user would only have to dilute the solution and adjust its alkalinity as desired; no addition of a stabilizer effecting in the alkaline solution would be required. The present invention provides such stannate stabilized acidic hydrogen peroxide solutions.

SUMMARY OF THE INVENTION

The stannate stabilized hydrogen peroxide solutions of the invention are acidic aqueous solutions containing generally from about 10 to about 90 weight percent hydrogen peroxide, a soluble stannate such as sodium stannate at a concentration effective to stabilize the solution, a soluble magnesium compound such as Epsom salt at a concentration of at least about 10 grams per liter, an alkylidene diphosphonic acid, or an ammonium or an alkali metal salt thereof, at a concentration effective to prevent precipitation of the stannate in the presence of the magnesium salt, which diphosphonic acid is of the formula

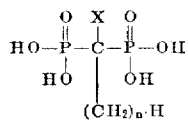

wherein X is hydrogen or the hydroxyl radical (—OH) and $n$ is a whole number from 0 to 5.

In a preferred embodiment of the invention, the above stannate stabilized acidic hydrogen peroxide solution additionally contains a soluble pyrophosphate such as pyrophosphoric acid or an ammonium or alkali metal salt thereof, or a soluble fluosilicate such as an ammonium, alkali metal or magnesium fluosilicate.

DETAILED DESCRIPTION AND PREFERRED EMBODIMENTS

The soluble stannates that are usable in preparing the stabilized hydrogen peroxide solutions of the invention are ammonium stannate and the alkali metal stannates such as sodium and potassium stannates. The use of sodium stannate, which is available commercially as the trihydrate, $Na_2SnO_3 \cdot 3H_2O$, is preferred.

The alkylidene diphosphonic acid compounds which are usable are those diphosphonic acids of the formula

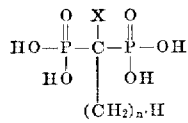

wherein X is hydrogen or the hydroxyl radical (—OH) and $n$ is a whole number from 0 to 5, and the ammonium and alkali metal salts thereof. Examples of such diphosphonic acids are methylene and ethylidene diphosphonic acids; and 1-hydroxyethylidene, 1-hydroxypropylidene and 1-hydroxybutylidene diphosphonic acids. The use of 1-hydroxyethylidene diphosphonic acid is preferred because it is available commercially.

The magnesium compounds that are usable are those soluble magnesium salts whose anions are inert, i.e., do not adversely react with hydrogen peroxide or the stannate, and do not catalyze the decomposition of hydrogen peroxide. Examples of such magnesium salts are the acetate, the orthoborate, the nitrate, the fluosilicate and the sulfate. Magnesium chloride can also be used, but its use is generally not desirable because the presence of chloride ions in hydrogen peroxide solutions tends to cause corrosion of aluminum containers and equipment in which such solutions are often stored or handled. The preferred magnesium salts are the fluosilicate and the sulfate which is generally available as Epsom salt, $MgSO_4 \cdot 7H_2O$.

Because the relatively concentrated acidic hydrogen peroxide solutions that are sold commercially are often stored and handled in aluminum containers and equipment, such peroxide solutions usually contain, in addition to the peroxide stabilizer or stabilizers, a source of nitrate ions. It has long been known that nitrate ions are highly effective in inhibiting the corrosion of aluminum by such peroxide solution, in view of which it has been the common practice to incorporate a source of nitrate ions in such solutions, regardless of the peroxide stabilizer employed. In the absence of nitrate ions, corrosion of aluminum can be severe, even when only a trace of chloride ions is present. Suitable sources of nitrate ions are nitric acid, ammonium nitrate and the alkali metal nitrates. Such compounds are generally employed at concentrations of from 0.01 to 1 gram per liter of the peroxide solution. However, the presence of such a nitrate in the stabilized solutions of the invention is not essential.

Suitable pyrophosphates for incorporation into the stannate stabilized hydrogen peroxide, are pyrophosphoric acid and the ammonium and alkali metal salts thereof. Illustrative of such salts are the tetra ammonium and tetra alkali metal pyrophosphates, and the corresponding dihydrogen pyrophosphates. Of these, the sodium and potassium salts are generally preferred and tetrasodium pyrophosphate decahydrate, $Na_4P_2O_7 \cdot 10H_2O$, is most preferred.

Suitable soluble fluosilicates (sometimes also called silicofluorides) for incorporation) into the stannate stabilized hydrogen peroxide solutions for the invention are the ammonium, magnesium and alkali metal fluosilicates, examples of which are the potassium and sodium fluosilicates. The use of sodium and magnesium fluosilicates is preferred because they are most readily available. When it is desired that the stannate stabilized peroxide solution contain a soluble fluosilicate in addition to the required soluble magnesium compound, magnesium fluosilicate may be used to satisfy the requirements for both.

The hydrogen peroxide solution to be stabilized in accordance with the invention may be any acidic aqueous hydrogen peroxide solution containing at least about 10%, e.g., from 10 to about 90%, hydrogen peroxide by weight. The preferred solutions will contain from about 30 to 75% hydrogen peroxide, since such solutions are most generally sold commercially for dilution by the users in preparing alkaline solutions of lower peroxide content, e.g., 0.01 to 5%, for ultimate end uses. Such acidic peroxide solutions can be stabilized in accordance with the invention by the addition thereto of suitable amounts of a stannnate, an alkylidene diphosphonic acid compound, and a soluble magnesium compound of the kinds indicated above. Optionally, a pyrophosphate or a fluosilicate compound of the kinds indicated above may also be added. Although not essential, a nitrate also will generally be incorporated.

Preferably, such hydrogen peroxide solution is stabilized by first adding thereto a preformed stannate stabilizer composition, which preferably will also contain some of the alkylidene diphosphonic acid compound in such an amount as will provide the requisite concentration of stannate.

There is next added all or the remainder of the required amount of the alkylidene diphosphonic acid compound, following which the soluble magnesium compound is added. If the stabilized peroxide solution is also to contain a pyrophosphate or a fluosilicate, this is preferably added separately before, together with, or after the addition of any or all of the other materials indicated.

When stabilization of the peroxide solution is effected employing a preformed stannate stabilizer composition, as is preferred, such a composition can be readily prepared by dissolving a stannate of the kind indicated above in water to give a solution containing from about 0.1 to 40%, preferably 0.5 to 5%, dissolved stannnate, calculated as $Na_2SnO_3 \cdot 3H_2O$, and adding thereto an acid such as nitric acid, phosphoric acid, sulfuric acid or an alkylidene diphosphonic acid of the kind indicated above, in an amount sufficient to adjust the pH of the stannate solution to a value in the range 8 to 10.5, preferably 9 to 10. Advantageously, the resulting solution is allowed to age several days at room temperature, or for a shorter period at an elevated temperature, e.g., 1 to 5 hours at 75 to 100° C., prior to adding it to the hydrogen peroxide solution that is to be stabilized. Preferably, the acid used to adjust the pH of the original stannate solution as indicated above, is the alkylidene diphosphonic acid to be incorporated in the peroxide solution so that the preformed stannate stabilizer composition will contain both the stannate and at least part of the diphosphonic acid to be incorporated into the peroxide solution.

As indicated previously, the stannate can be added directly to the peroxide solution to be stabilized but it is preferably added as a preformed stabilizer composition prepared as indicated above. In either case, the amount of stannate added should be sufficient to effectively stabilize the peroxide solution. Stannate concentrations, calculated as $Na_2SnO_3 \cdot 3H_2O$, in the peroxide solution as low as 2 mg. per liter will usually exert a worthwhile stabilizing effect, but concentrations ranging from 20 to 2000 mg. per liter or higher will generally be used, with the most preferred concentrations ranging from about 30 to about 500 mg. per liter.

The concentration of the magnesium compound in the stabilized peroxide solution should be relatively high so that when the solution is diluted for use under alkaline conditions, the diluted solution will contain the magnesium compound at a concentration effective to stabilize the diluted alkaline solution. Generally, the concentration of the magnesium compound in the stabilized acidic peroxide solution will be at least 10 grams per liter, and concentrations up to the maximum amount of the magnesium compound that can be dissolved in the solution can be used. However, concentrations greater than about 100 grams per liter are usually not necessary and concentrations of from about 40 to 100 grams per liter are generally preferred.

The alkylidene diphosphonic acid compound in the stabilized hydogen peroxide appears to form a complex with the stannate which remains soluble desipte the presence of high concentrations of magnesium ions. The minimum amount of the diphosphonic acid compound to be used should therefore be that amount which will be required to maintain the stannate in a soluble state. Amounts greater than such minimum amount can and generally will be used. The minimum amount will depend mainly upon the concentration at which the stannate is present, and will increase as the stannate concentration is increased. The minimum concentration may also be dependent somewhat upon concentration of the magnesium salt, but the concentration of the stannate will generally be controlling. It is usually desirable to use considerably more than the minimum required amount of the diphosphonic acid compound to insure against any satnnate precipitate occurring and concentrations ranging from around 250 to 5000 mg. per liter give good results when stannnate concentrations within the preferred stannate range of 30 to 500 mg. per liter are used. Still higher concentrations can be used if desired.

When pyrophosphate or a fluosilicate is to be incorporated into the stabilized solutions, any amount thereof will generally be beneficial and amounts up to the maximum amount that will dissolve in the solution can be used. Generally, pyrophosphate concentrations ranging from 2 to 50 grams per liter, and fluosilicate concentrations ranging from 2 to 100 grams per liter, are recommended. When a pyrophosphate is added, it is thought to react with the magnesium salt, when the solution is diluted and rendered alkaline, to form magnesium pyrophosphate which functions as the stabilizer. Similarly, when a fluosilicate such as sodium fluosilicate is added, it is thought to react with, for example, magnesium sulfate and the alkali to form magnesium silicate as follows:

$$MgSO_4 + Na_2SiF_6 + 6NaOH \rightarrow MgSiO_3$$
$$+ 6NaF + Na_2SO_4 + 3H_2O$$

Magnesium pyrophosphate and magnesium silicate, in soluble or colloidal form, are known to be highly effective stabilizers in alkaline peroxide solutions.

The invention is illustrated by the following examples in which all compositions expressed as percentages are by weight. All pH values reported are the apparent pH values as directly measured using a glass electrode.

Unless indicated otherwise, the sodium stannate stabilizer concentrations reported in the examples were obtained by the addition of appropriate amounts of a stock stannate stabilizer solution to the peroxide solutions to be stabilized. The stock solution was prepared by dissolving $NaSnO_3 \cdot 3H_2O$ in distilled water to give a solution containing about 5.5 grams of the stannate per liter and having a pH of about 11. The pH of the solution was adjusted to 9.3 by the addition of a 50% (by weight) solution of 1-hydroxethylidene diphosphonic acid. The solution was then heated under agitation at 85° C. for two hours, following which it was diluted with distilled water to a stannate concentration, calculated as $Na_2SnO_3 \cdot 3H_2O$, of 5 grams per liter. Thus, the final solution contained 5 grams of the stannate and 2.5 grams of the disphosphonic acid, per liter.

EXAMPLE I

To each of two samples, A and B, of an unstabilized 35% hydrogen peroxide solution there was added sufficient of the stock stannate stabilizer solution to provide therein 50 mg. sodium stannate ($Na_2SnO_3 \cdot 3H_2O$) and 25 mg. 1-hydroxyethylidene diphosphonic acid per liter. Epsom salts, $MgSO_4 \cdot 7H_2O$, was then added to samples A and B in concentrations, respectively, of 20 and 40 grams per liter, following which 100 mg. per liter of ammonium nitrate was added to each. The pH of samples A and B was finally adjusted to about 1.5 by the addition of 1-hydroxyethylidene diphosphonic acid to provide therein a total of about 500 mg. per liter of the disphosphonic acid. Portions of the two samples were then heated for 15 hours at 100° C. to determine their active oxygen losses under the test conditions. The losses for samples A and B, respectively, were only 0.1 and 0.3%. Both samples remained clear after standing at room temperature for 15 months.

EXAMPLE II

To a solution of 35% hydrogen peroxide stabilized according to sample B of Example I, there was added 40 grams per liter of tetrasodium pyrophosphate, $Na_4P_2O_7 \cdot 10H_2O$, to form sample C. To a solution of 35% hydrogen peroxide stabilized according to sample B of Example I, there was added 5 grams per liter of sodium fluosilicate to form sample D. The pH of samples C and D was then adjusted to 1.8 using phosphoric acid. In stability tests at 100° C. for 15 hours, samples C and D showed active oxygen losses of 0.9 to 1.5%, respectively.

Portions of samples C and D were diluted with water to hydrogen peroxide concentrations of 1.5% and 0.15%, and the pH of the diluted solutions was adjusted to 11.5 by the addition of caustic soda. Similar dilute solutions (controls) having the same peroxide concentrations and pH were prepared using a 35% hydrogen peroxide solution stabilized with only 50 mg. sodium stannate and containing 100 mg. ammonium nitrate per liter. The diluted solutions at pH 11.5 were then tested for their stabilities at 82° C. (180° F.), with the following results:

| Diluted solutions | Percent active oxygen lost at 82° C. after— | | |
|---|---|---|---|
| | 1 hour | 3 hours | 5 hours |
| Series 1 (1.5% H₂O₂) | | | |
| From Sample C | 12.9 | 30.7 | 41.1 |
| From Sample D | 10.4 | 28.9 | 42.9 |
| Control | 87.2 | 98.7 | 100 |
| Series 2 (0.15% H₂O₂) | | | |
| From Sample C | 25 | 58.3 | 75 |
| From Sample D | 25 | 62.5 | 87.5 |
| Control | 97.5 | 100 | |

The above data show that the dilute solutions prepared from samples C and D were much more stable under the same pH and temperature conditions than were the control solutions.

EXAMPLE III

Alkaline peroxide solutions having a pH of 11.5 and containing 1.5% hydrogen peroxide were prepared by diluting various stannate stabilized 35% solutions, and the pH of the diluted solutions was adjusted to 11.5 by the addition of caustic soda. The initial stannate stabilized solutions, A through G, each contained 50 mg.

$$Na_2SnO_3 \cdot 3H_2O$$

and 100 mg. $NH_4NO_3$ per liter. Additionally, solution A contained 40 g. per liter of $Na_4P_2O_7 \cdot 10H_2O$; solution B contained 500 mg. 1-hydroxyethylidene diphosphonic acid, 40 g. $Na_4P_2O_7 \cdot 10H_2O$ and 40 g. $MgSO_4 \cdot 7H_2O$ per liter; solution C (control) contained no additional materials; solution D contained 5 g. $Na_2SiF_6$ per liter; solution E contained 500 mg. 1-hydroxyethylidene diphosphonic acid, 40 g. $MgSO_4 \cdot 7H_2O$ and 5 g. $Na_2SiF_6$ per liter; solution F contained 500 mg. 1-hydroxyethylidene diphosphonic acid and 40 g. $MgSO_4 \cdot 7H_2O$ per liter; and solution G was the same as solution F, except that the equivalent of 10 g. sodium silicate per liter was added to the diluted solution after its pH had been adjusted to 11.5. The diluted alkaline solutions prepared from solutions A to G were tested for their stabilities at 82° C. with results as follows:

| Diluted test solutions | Percent active oxygen lost at 82° C. after— | | |
|---|---|---|---|
| | 1 hour | 3 hours | 5 hours |
| From A | 88.7 | 100 | |
| From B | 12.9 | 30.7 | 41.1 |
| From C (control) | 88.7 | 100 | |
| From D | 95.2 | 100 | |
| From E | 10.5 | 28.9 | 42.9 |
| From F | 22.4 | 54 | 69.8 |
| From G | 12.1 | 30.3 | 40.6 |

It will be seen from the above data that all test solutions prepared from the stabilized 35% peroxide solutions which contained magnesium sulfate, i.e., solutions B, E, F and G, were much more stable than test solutions A, C and D, i.e., those prepared from stabilized 35% peroxide solution which did not contain magnesium sulfate. Furthermore, the most stable test solutions were those prepared from stabilized 35% peroxide solutions B, E and G which contained magnesium sulfate in combination with either sodium pyrophosphate (solution B) or sodium fluosilicate (solution E), or contained magnesium sulfate with sodium silicate being added to the diluted alkaline test solution (solution G).

EXAMPLE IV

A sample of 35% hydrogen peroxide solution was stabilized by the addition of the stock stannate stabilizer solution previously described, following which Epsom salt was added and the pH of the solution was adjusted to 1.8 by the addition of 1-hydroxyethylidene diphosphonic acid. The resulting stabilized solution, A, contained 50 mg. $Na_2SnO_3 \cdot 3H_2O$, 500 mg. of the diphosphonic acid and 80 g. $MgSO_4 \cdot 7H_2O$ per liter. Other samples of the 35% hydrogen peroxide solution were stabilized using three stannate stabilizer solutions prepared the same way as was the stock stannate stabilizer solution except that phosphoric acid, sulfuric acid and nitric acid, respectively, were used to adjust the pH of the original stannate solutions. Furthermore, after the addition of these stannate stabilizer solutions, followed by the addition of Epson salt, the pH of the resulting peroxide solutions was adjusted by the addition, respectively, of phosphoric acid, sulfuric acid and nitric acid. The resulting stabilized 35% hydrogen peroxide solutions, B, C and D, each contained 25 mg.

$$Na_2SnO_3 \cdot 3H_2O$$

and 80 g. $MgSO_4 \cdot 7H_2O$ per liter; each had a pH of 1.6; and each contained the acid ($H_3PO_4$, $H_2SO_4$ or $HNO_3$) that was used to adjust the pH of the stannate stabilizer solution and the final peroxide solution in place of the diphosphonic acid used for solution A.

Stannate precipitation occurred in each of solutions B, C and D even though they contained only one-half as much stannate as did solution A. Solution A, which remained clear, lost only 0.8% of its active oxygen during 15 hours at 100° C., whereas the corresponding active oxygen losses for solutions B, C, and D, respectively, were 2.6%, 2.5%, and 1.8%.

EXAMPLE V

The stability of the stabilized 35% hydrogen peroxide solution A of Example IV was compared with the stabilities of other 35% hydrogen peroxide solutions, B and C, to which no stannate stabilizer was added. Each of solutions B and C contained 80 g. $MgSO_4 \cdot 7H_2O$ per liter, and the pH of solution B was adjusted to 1.7 by the addition of 585 mg. per liter of 1-hydroxyethylidene diphosphonic acid, while the pH of solution C was adjusted to 1.6 by the addition of sulfuric acid. The active oxygen losses for solutions A, B and C, respectively, during 15 hours at 100° C., were 0.8%, 2.0% and 30%.

EXAMPLE VI

Samples of a 35% hydrogen peroxide solution were stabilized in the general manner described for stabilizing solution A of Example IV, except that the resulting stabilized solutions, X, Y and Z, contained the stabilizer components in somewhat different proportions, including substantially higher concentrations of magnesium sulfate, and their final pH's were 1.5–1.6. Solution X contained 47 mg. $Na_2SnO_3 \cdot 3H_2O$, 465 mg. 1-hydroxyethylidene diphosphonic acid, 96 mg. $NH_4NO_3$ and 115 g. $MgSO_4 \cdot 7H_2O$ per liter. Solution Y contained 42 mg. $Na_2SnO_3 \cdot 3H_2O$, 409 mg. 1-hydroxyethylidene diphosphonic acid, 85 mg. $NH_4NO_3$ and 203 g. $MgSO_4 \cdot 7H_2O$ per liter. Solution Z contained 42 mg. $Na_2SNO_3 \cdot 3H_2O$, 405 mg. 1-hydroxyethylidene disphosphonic acid, 84 mg. $NH_4NO_3$ and 513 g. $MgSO_4 \cdot 7H_2O$ per liter. All of these solutions remained clear despite their high magnesium sulfate contents which was at approximately the saturation point for solution Z. The active oxygen losses for solutions X, Y and Z, respectively, in the 100° C.–15 hour stability test were 1.2%, 2.7% and 8.7%. These losses, particularly that for solution Z, were somewhat on the high side since it appears that for optimum stability when such high concentrations of magnesium sulfate are present somewhat higher concentrations of the stannate and the diphosphonic acid are required than were used.

EXAMPLE VII

Various higher strength hydrogen peroxide solutions were stabilized in the general manner described for stabilizing solution A of Example IV, except that the resulting stabilized solutions contained the stabilizer components in somewhat different proportions. The compositions of the solutions and their active oxygen losses in the 100° C.–15 hour stability test are reported in the following tabulation.

|  | Solution | | | | |
|---|---|---|---|---|---|
|  | A | B | C | D | E |
| H$_2$O$_2$, percent | 50.5 | 50.0 | 48.2 | 72.2 | 88.8 |
| Na$_2$SnO$_3$.3H$_2$O, mg./l | 98 | 97 | 74 | 102 | 113 |
| Diphosphonic Acid,[1] mg./l | 715 | 710 | 765 | 1,055 | 1,125 |
| NH$_4$NO$_3$, mg./l | 98 | 97 | 74 | 102 | 102 |
| MgSO$_4$.7H$_2$O, g./l | 98 | 194 | 516 | 82 | 18.7 |
| pH | 0.8 | 0.7 | 0.2 | [2] −0.4 | [2] −2.1 |
| Appearance | Clear | Clear | Clear | Clear | [3] Cloudy |
| Active oxygen lost in 15 hrs. at 100° C., percent | 0.5 | 1.0 | 2.1 | 0.4 | 2.1 |

[1] 1-hydroxyethylidene diphosphonic acid.
[2] Extrapolated pH value.
[3] The slight cloudiness in this solution was due to precipitated magnesium sulfate.

EXAMPLE VIII

This example compares the stabilities of three 35% hydrogen peroxide solutions that were stabilized at various pH values. Solution A was stabilized by adding separately thereto appropriate amounts of a 20% aqueous solution of sodium stannate, a 5% aqueous solution of sodium pyrophosphate and a 40% aqueous solution of ammonium nitrate so as to give in the peroxide solution 100 mg. Na$_2$SnO$_3$·3H$_2$O, 50 mg. Na$_4$N$_2$O$_7$·10H$_2$O and 20 mg. NH$_4$NO$_3$ per liter. Test portions of the resulting peroxide solution were adjusted to the pH values indicated below by additions of phosphoric acid. Solution B was stabilized in the general manner described for the stabilization of solution A in Example IV, except that the stock stannate stabilizer solution was added in an amount to provide 100 mg. (instead of 50 mg.) Na$_2$SnO$_3$·3H$_2$O, 50 mg. 1-hydroxyethylidene diphosphonic acid and 100 mg. NH$_4$NO$_3$ per liter in the stabilized peroxide solution, following which 80 g. per liter of MgSO$_4$·7H$_2$O was added. The test portions of the resulting peroxide solution were adjusted to the pH values indicated below by the addition of either caustic soda or 1-hydroxyethylidene diphosphonic acid, as required. Solution C was stabilized simply by adding separately to the unstabilized peroxide solution of a 50% solution of 1-hydroxyethylidene diphosphonic acid, then solid sodium stannate, solid ammonium nitrate and solid Epsom salt to provide in the peroxide solution, 550 mg. of the diphosphonic acid, 100 mg. Na$_2$SnO$_3$·3H$_2$O, 100 mg. NH$_4$NO$_3$ and 80 g. MgSO$_4$·7H$_2$O per liter. The test portions of solution C were adjusted to the pH values indicated below by the addition of either caustic soda or the diphosphonic acid, as required. The results of the stability tests were as follows:

| pH | Active oxygen lost in 15 hours at 100° C., percent | | |
|---|---|---|---|
|  | Solution A | Solution B | Solution C |
| 3.7 | 0.3 | 11.2 | 11 |
| 3.2 | 0.3 | 5.6 | 16 |
| 2.7 | 0.2 | 3.6 | 6.4 |
| 2.2 | 0.1 | 2.4 | 4.7 |
| 1.7 | 0.1 | 1.2 | 2.8 |
| 1.2 | 0.1 | 0.6 | 1.0 |
| 0.7 | 0.1 | 0.5 | 0.4 |
| 0.2 | 0.7 | 1.2 | 0.6 |

The concentrations of stannate and magnesium sulfate were the same in solutions B and C and, at any given pH, the concentrations of the diphosphonic acid were essentially the same. The fact that the solution B samples were generally somewhat more stable than were the corresponding samples for solution C shows that adding the stabilizer components directly and separately, as was done in the case of Solution C, is somewhat less effective than adding a stannate solution that had previously been partially neutralized with the diphosphonic acid and aged by heating, then adding the other components, as was done in the case of solution B.

The above data also show that for solution A, which contained the same concentration of stannate as did the other solutions but did not contain any diphosphonic acid or magnesium sulfate, the stability did not vary greatly over the entire pH range of 0.2 to 3.7. On the other hand, solutions B and C were significantly more stable at the pH values lower than 2.2.

The hydrogen peroxide solutions stabilized in accordance with the invention should be acidic. In general, the stabilized solutions should have a pH not exceeding 6. Preferably, the pH will not exceed about 3. Acidic hydrogen peroxide solutions are generally considered to be most stable at their equivalence point, which point varies depending upon the hydrogen peroxide concentration. The approximate equivalence points, expressed as apparent pH values measured directly by a glass electrode, for 35%, 50%, 70% and 90% hydrogen peroxide solutions, respectively, are 3.7, 2.7, 1.5 and −0.2. (See Elston U.S. Pat. 2,497,814.) When stabilizing peroxide solutions in accordance with the present invention it is preferred that the apparent pH of the stabilized solution be adjusted to a value which is from 2 to about 3.5, most preferably 2.5 to 3, pH units below the apparent pH representing the equivalence point.

As indicated above, all pH values reported herein are "apparent pH" values measured directly on the pH meter using a glass electrode. Such measurements are of course in terms of electrical potential (millivolts) developed by the electrode system. Negative apparent pH values are obtained by extrapolation of the pH values against electrical potential. The apparent pH differs from the true aqueous pH of the solution by a known correction which varies with the hydrogen peroxide concentration. Values for this correction as a function of the hydrogen peroxide concentration have been reported by Kolczynski et al., Journal of the American Chemical Society, vol. 79, pp. 531–533 (1957).

I claim:

1. A stannate stabilized acidic aqueous hydrogen peroxide solution containing at least about 10% hydrogen peroxide by weight, said solution having dissolved therein (a) an ammonium or alkali metal stannate at a concentration, calculated as Na$_2$SnO$_3$·3H$_2$O of at least 2 mg. per liter, (b) a soluble magnesium salt at a concentration of at least 10 grams per liter and (c) an alkylidene diphosphonic acid, or an ammonium or alkali metal salt thereof, at a concentration effective to prevent precipitation of said stannate in the presence of said magnesium salt, which diphosphonic acid is of the formula

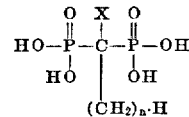

wherein X is hydrogen or the hydroxyl radical and $n$ is a whole number from 0 to 5.

2. A stabilized hydrogen peroxide solution according to claim 1 which has a pH not exceeding 3 and a hydrogen peroxide content of 10 to 90% by weight, and wherein component (a) is present at a concentration, calculated as Na$_2$SnO$_3$·3H$_2$O, of from 20 to 2000 mg. per liter and component (b) is present at a concentration of at least 40 g. per liter.

3. A stabilized hydrogen peroxide solution according to claim 1 which has a pH not exceeding 3 and a hydrogen peroxide content of 30 to 75% by weight, and wherein component (a) is sodium stannate which is present at a concentration, calculated as Na$_2$SnO$_3$·3H$_2$O, of from 20 to 2000 mg. per liter, component (b) is magnesium sulfate and is present at a concentration of from 40 to 100 grams per liter, and component (c) is 1-hydroxyethylidene diphosphonic acid and is present at a concentration of from about 250 to 5000 mg. per liter.

4. A stabilized hydrogen peroxide solution according to claim 3, said solution having a pH which is from 2 to 3.5 pH units below that pH which represents the equivalence point of the stabilized hydrogen peroxide solution.

5. A stabilized hydrogen peroxide solution according to claim 3, said solution having a pH which is from 2.5 to 3 pH units below that pH which represents the equivalence point of the stabilized hydrogen peroxide solution.

6. A stabilized hydrogen peroxide solution according to claim 1 which also contains pyrophosphoric acid or an ammonium or alkali metal salt thereof.

7. A stabilized hydrogen peroxide solution according to claim 2 which also contains pyrophosphoric acid, or an ammonium or alkali metal salt thereof at a concentration of from about 2 to 50 grams per liter.

8. A stabilized hydrogen peroxide solution according to claim 3 which also contains pyrophosphoric acid, or an ammonium or alkali metal salt thereof at a concentration of from about 2 to 50 grams per liter.

9. A stabilized hydrogen peroxide solution according to claim 4 which also contains sodium pyrophosphate at a concentration of from about 2 to 50 grams per liter.

10. A stabilized hydrogen peroxide solution according to claim 1 which also contains an ammonium, alkali metal or magnesium fluosilicate.

11. A stabilized hydrogen peroxide solution according to claim 2 which also contains an ammonium, alkali metal or magnesium fluosilicate at a concentration of from about 2 to 100 grams per liter.

12. A stabilized hydrogen peroxide solution according to claim 3 which also contains an ammonium, alkali metal or magnesium fluosilicate at a concentration of from about 2 to 100 grams per liter.

13. A stabilized hydrogen peroxide solution according to claim 4 which also contains an ammonium, alkali metal or magnesium fluosilicate at a concentration of from about 2 to 100 grams per liter.

14. A method for preparing a stable, alkaline, dilute aqueous hydrogen peroxide solution comprising diluting and alkalizing the stabilized hydrogen peroxide solution of claim 1.

15. A method for preparing a stable, alkaline, dilute aqueous hydrogen peroxide solution comprising diluting and alkalizing the stabilized hydrogen peroxide solution of claim 2.

16. A method for preparing a stable, alkaline, dilute aqueous hydrogen peroxide solution comprising diluting and alkalizing the stabilized hydrogen peroxide solution of claim 6.

17. A method for preparing a stable, alkaline, dilute aqueous hydrogen peroxide solution comprising diluting and alkalizing the hydrogen peroxide solution of claim 10.

18. A method for preparing an acid and alkaline stable aqueous hydrogen peroxide solution containing at least about 10% hydrogen peroxide by weight comprising:
(a) preparing an acidic hydrogen peroxide solution having dissolved therein an ammonium or alkali metal stannate at a concentration, calculated as $Na_2SnO_3 \cdot 3H_2O$, of at least 2 mg. per liter,
(b) dissolving in the solution of part (a) a magnesium salt at a concentration of at least 10 g. per liter and an alkylidene diphosphonic acid, or an ammonium or alkali metal salt thereof, at a concentration effective to prevent precipitation of said stannate in the presence of said magnesium salt, which diphosphonic acid is of the formula

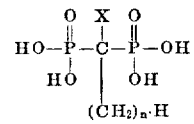

wherein X is hydrogen or the hydroxyl radical and $n$ is a whole number from 0 to 5.

19. A method according to claim 18 wherein the acid and alkaline stable aqueous hydrogen peroxide solution has a pH not exceeding 3 and a hydrogen peroxide content of 10 to 90% by weight, the stannate concentration is 20 to 2000 mg. per liter, and the magnesium salt concentration is at least 40 g. per liter.

20. A method according to claim 19 wherein there is dissolved in the acid and alkaline stable aqueous hydrogen peroxide solution an additional ingredient selected from the group consisting of pyrophosphoric acid, an ammonium or alkali metal salt thereof, and a fluosilicate of ammonium, magnesium or an alkali metal.

References Cited

UNITED STATES PATENTS

| | | | |
|---|---|---|---|
| 3,387,939 | 6/1968 | Reilly et al. | 23—207.5 |
| 1,181,409 | 5/1916 | Schaidhauf | 23—207.5 |
| 3,037,838 | 6/1962 | Lindner | 23—207.5 |
| 2,004,809 | 6/1935 | Gilbert et al. | 23—207.5 |
| 1,987,059 | 1/1935 | Goerner | 252—186 |

OSCAR R. VERTIZ, Primary Examiner

H. S. MILLER, Assistant Examiner

U.S. Cl. X.R.

252—186; 423—584